(12) United States Patent
Kim

(10) Patent No.: US 6,642,992 B2
(45) Date of Patent: Nov. 4, 2003

(54) LIQUID CRYSTAL DISPLAY PANEL AND METHOD OF MANUFACTURING THE SAME

(75) Inventor: Kyeong Jin Kim, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 23 days.

(21) Appl. No.: 09/986,189

(22) Filed: Nov. 7, 2001

(65) Prior Publication Data

US 2002/0054270 A1 May 9, 2002

(30) Foreign Application Priority Data

Nov. 8, 2001 (KR) ................................. 2000-0066138

(51) Int. Cl.$^7$ ................. G02F 1/1337; G02F 1/1333; G02F 1/1339
(52) U.S. Cl. ................. 349/191; 349/93; 349/153; 349/190
(58) Field of Search .................. 349/93, 153, 191, 349/190

(56) References Cited

U.S. PATENT DOCUMENTS

| | | | |
|---|---|---|---|
| 4,691,995 A | | 9/1987 | Yamazaki et al. |
| 5,598,285 A | | 1/1997 | Kondo et al. |
| 5,686,978 A | * | 11/1997 | Oh .................. 349/93 |
| 5,986,729 A | * | 11/1999 | Yamanaka et al. ........ 349/79 |
| 6,017,468 A | * | 1/2000 | Chung et al. ........ 252/299.5 |
| 6,049,369 A | | 4/2000 | Yanagawa et al. |
| 6,118,508 A | | 9/2000 | Park |
| 6,417,898 B1 | * | 7/2002 | Izumi .................. 349/73 |

FOREIGN PATENT DOCUMENTS

| | | |
|---|---|---|
| JP | 6-235925 | 8/1994 |
| JP | 8-101395 | 4/1996 |
| JP | 9-61829 | 3/1997 |
| JP | 10-177178 | 6/1998 |
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |

OTHER PUBLICATIONS

R. Kiefer, et al., "In–Plane Switching of Nematic Liquid Crystals." Japan Display '92, pp. 547–550.
M. Oh–e et al., Principles and Characteristics of Electro–Optical Behavior With In–Plane Switching Mode, Asia Display '95, pp. 577–580.
M. Ohta et al., Development of Super–TFT–LCDs With In–Plane Switching Display Mode, Asia Display '95, pp. 707–710.
S. Matsumoto et al., Display characteristics of In–Plane–Switching (IPS) LCDs and a Wide–Viewing–Angle 14,5–in. IPS TFT–LCD, Euro Display '96, pp. 445–448.
H. Wakemoto et al., An Advanced In–Plane–Switching Mode TFT–LCD, SID 97 Digest, pp. 929–932.
S.H. Lee et al., "High–Transmittance, Wide–Viewing–Angle Nematic Liquid Crystal Display Controlled by Fring–Field Switching," Asia Display 98, pp. 371–374.

* cited by examiner

*Primary Examiner*—Robert H. Kim
*Assistant Examiner*—Jeanne Di Grazio
(74) *Attorney, Agent, or Firm*—Morgan, Lewis & Bockius LLP

(57) ABSTRACT

A method for manufacturing a liquid crystal display panel includes preparing first and second substrates having an active region, forming a sealant along a periphery of the active region on at least one of the first and second substrates, dispersing a liquid crystal material on the at least one substrate, the liquid crystal material having a photoreactant material, attaching the first and second substrates, and irradiating ultraviolet light on an entire surface of the at least one substrate.

16 Claims, 8 Drawing Sheets

LIQUID CRYSTAL DISPLAY PANEL AND METHOD OF MANUFACTURING THE SAME

The present invention claims the benefit of Korean Patent Application No. P2000-0066138 filed in Korea on Nov. 8, 2000, which is hereby incorporated by reference.

BACKGROUND OF THE INVENTION

1. Field of the Invention

The present invention relates to a liquid crystal display (LCD), and more particularly, to a liquid crystal display panel and method for manufacturing a liquid crystal display panel.

2. Background of the Related Art

Historically, the cathode ray tube (CRT) has been widely used as a display device in applications such as televisions and computer monitors, for example, because CRT screens can display multiple colors with high brightness. However, the CRT cannot adequately satisfy present demands for display applications requiring reduced volume and weight, portability, and low power consumption while having a large screen size and high resolution. Accordingly, a greater emphasis has been placed on developing flat panel displays to replace the CRT. To date, flat panel displays have found wide application in monitors for computers, spacecraft, and aircraft. Examples of flat panel display types currently in use include liquid crystal displays (LCDs), electroluminescent displays (ELDs), field emission displays (FEDs), and plasma display panels (PDPs). Flat panel displays are advantageous because of their light weight, high luminance, high efficiency, high resolution, high speed response time, low driving voltage, low power consumption, low cost, and natural color.

Currently, LCD devices are widely used as monitors for portable computers. These LCDs typically include two opposing glass substrates with a liquid crystal layer sealed therebetween. A plurality of pixel patterns is formed on one of the glass substrates, and a color filter layer is provided on the other substrate. The two glass substrates are attached to each other using a sealant that serves to attach and fix the two glass substrates to each other. Since liquid crystal materials have low specific resistance and easily absorb ambient moisture, they are susceptible to contamination by impurities. Accordingly, the sealant used to attach the two glass substrates must also resist permeation of external moisture that can adversely affect the liquid crystal material. Commonly used sealants include inorganic and organic materials. Inorganic sealant materials have been conventional for sealing LCDs. However, with development of new liquid crystal materials, inorganic sealant materials are generally no longer used. Instead, organic epoxy-based resins such as phenol-based or acryl-based resins, for example, are presently used as LCD sealant materials. The organic epoxy-based resins can be divided into either a two-liquid state type that requires mixing a main material with a hardener, or a one-liquid state type that includes hardener already incorporated into the main material.

Depending on the type of hardener, an organic resin sealant is generally hardened by either a thermal process or exposure to ultra-violet (UV) rays. In either case, high adhesion strength, high crystallization ratio, and exceptional printing performance are required to obtain a seal with high reliability. Uniform distribution of the organic sealant also is necessary to accurately control a liquid crystal cell gap while pressurizing, heating, and hardening the glass substrates. Thermo-hardening resins have high mechanical strength, high adhesion strength, and high cross-linkage at high temperature. Epoxy and phenol resins are mainly used as a thermohardening resin. However, UV hardening resins are most often used for sealing large size display panels because, as compared to thermo-hardening resin, they harden at low temperature, have reduced hardening time and improved adhesion. Moreover, when a thermo-hardening resin is applied to large sized substrates, thermal expansion of the resin often occurs.

A related art LCD panel will now be described with reference to the accompanying drawings.

FIG. 1 is a plane view of a related art LCD panel, and FIGS. 2A to 2E are sectional views illustrating manufacturing processes of the related art LCD panel. In FIG. 1, the related art LCD panel comprises a thin film transistor (TFT) substrate 13 where an active region A is defined, a color filter substrate 15, and a sealant 17 for attaching the TFT substrate 13 to the color filter substrate 15. A plurality of TFTs and pixel electrodes are patterned on the TFT substrate 13 corresponding to the active region. In addition, a plurality of color filter patterns, light-shielding layers, and common electrodes are patterned on the color filter substrate 15.

FIGS. 2A–2E show a manufacturing process for the LCD panel.

In FIG. 2A, the TFT substrate 13 and the color filter substrate 15 are prepared. In the TFT substrate 13, a plurality of TFTs and pixel electrodes are patterned on an active region of the TFT substrate 13. In the color filter substrate 15, a color filter pattern is formed. Then, a first alignment layer 16 and a second alignment layer 16a are formed on the TFT substrate 13 and the color filter substrate 15, respectively. The TFT substrate 13 includes a gate line orthogonally crossing a data line formed on a glass substrate. The TFT is formed at each crossing point of the gate and data lines. The TFT includes a gate electrode that extends to the gate line and source/drain electrodes that extend to the data line. The TFT further includes a pixel electrode electrically connected with the drain electrode. Meanwhile, the color filter substrate 15 is provided with red (R), green (G), and blue (B) color filter patterns to display colors on the glass substrate, a light-shielding layer that prevents light from being transmitted to regions other than the pixel electrode, and common electrodes for applying a voltage to the pixel electrode.

In FIG. 2B, a spacer 19 is formed on the TFT substrate 13 to maintain a cell gap. A UV hardening sealant 17 is then formed along a periphery of the active region on the color filter substrate 15. In FIG. 2C, liquid crystals 21 are dispersed on the active region inside the sealant 17 by a dispensing method.

FIG. 2D, the TFT substrate 13 is attached to the color filter substrate 15 in a chamber so that the liquid crystals 21 are uniformly dispersed in the cell, thereby forming a liquid crystal layer 21a.

In FIG. 2E, the active region filled with the liquid crystals is masked, and the sealant 17 is irradiated by UV light using an opened mask 23, thereby hardening the sealant 17.

However, the related art method for manufacturing an LCD panel has several problems. With the development of large-sized LCD panels, UV hardening sealants are conventionally used to attach lower and upper substrates to each other. In this case, UV light must be radiated on the UV hardening sealant and not on the active region that is filled with liquid crystals. Accordingly, if UV light is irradiated on the entire LCD panel without a mask, characteristics of the liquid crystals are changed by the UV light, thereby deteriorating picture quality. Therefore, it is necessary to use a mask to prevent the UV light from irradiating the active region. Implementing a mask will increase costs.

SUMMARY OF THE INVENTION

Accordingly, the present invention is directed to a liquid crystal display panel and a method of manufacturing a liquid crystal display panel that substantially obviates one or more problems due to limitations and disadvantages of the related art.

An object of the present invention is to provide a method for manufacturing a liquid crystal display panel, in which a UV hardening sealant is hardened without using a separate mask.

Another object of the present invention is to provide a liquid crystal display panel manufactured with reduced production costs.

Additional features and advantages of the invention will be set forth in the description which follows, and in part will be apparent from the description, or may be learned by practice of the invention. The objectives and other advantages of the invention may be realized and attained by the method and structure particularly pointed out in the written description and claims hereof as well as the appended drawings.

To achieve these objects and other advantages and in accordance with the purpose of the invention, as embodied and broadly described herein, a method for manufacturing a liquid crystal display panel includes preparing first and second substrates having an active region, forming a sealant along a periphery of the active region on at least one of the first and second substrates, dispersing a liquid crystal material on the at least one substrate, the liquid crystal material having a photo-reactant material, attaching the first and second substrates, and irradiating ultraviolet light on an entire surface of the at least one substrate.

In another aspect, a liquid crystal display device includes a first substrate, a second substrate opposing the first substrate, at least one sealant along a periphery of one of the first and second substrates, and a liquid crystal layer between the first and second substrates, the liquid crystal layer a photo-reactant material.

In another aspect, a method for manufacturing a liquid crystal display panel includes forming at least one sealant along a periphery of an active region between first and second substrates, dispersing a liquid crystal material in the active region, the liquid crystal material having a photo-reactant material, and irradiating ultraviolet light on an entire surface of the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
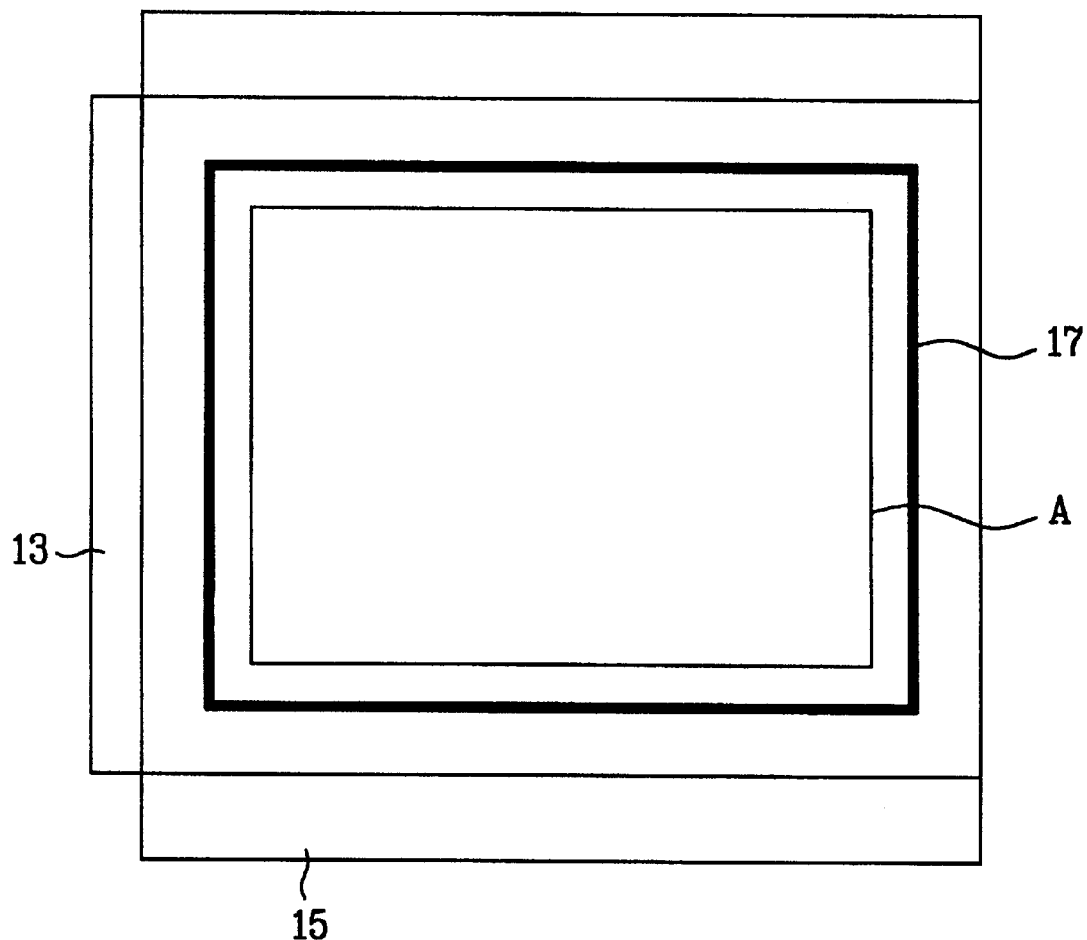
FIG. 1 is a plane view of a related art LCD panel.
Figure 2A:
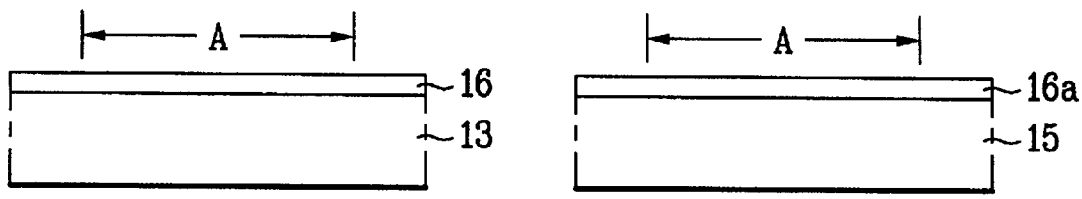
FIGS. 2A to 2E are cross-sectional views illustrating process steps of manufacturing the related art LCD panel.
Figure 2B:
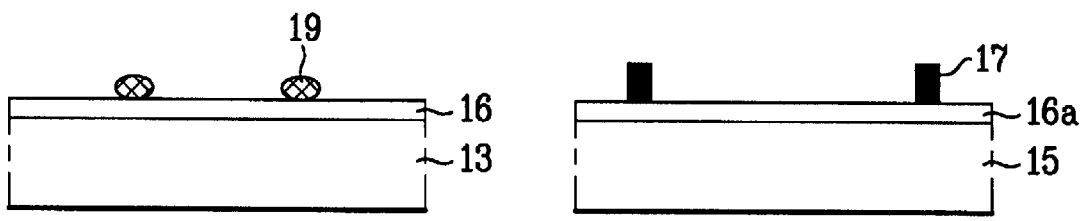
Figure 2C:
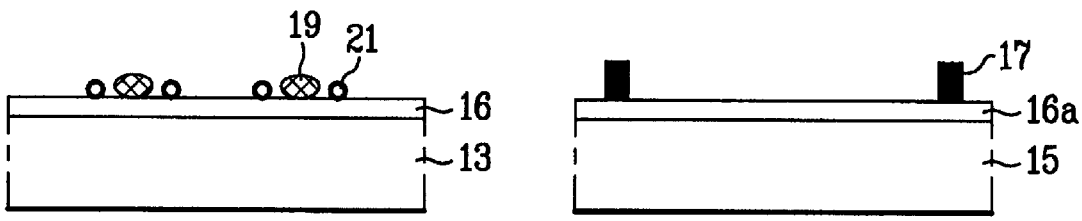
Figure 2D:
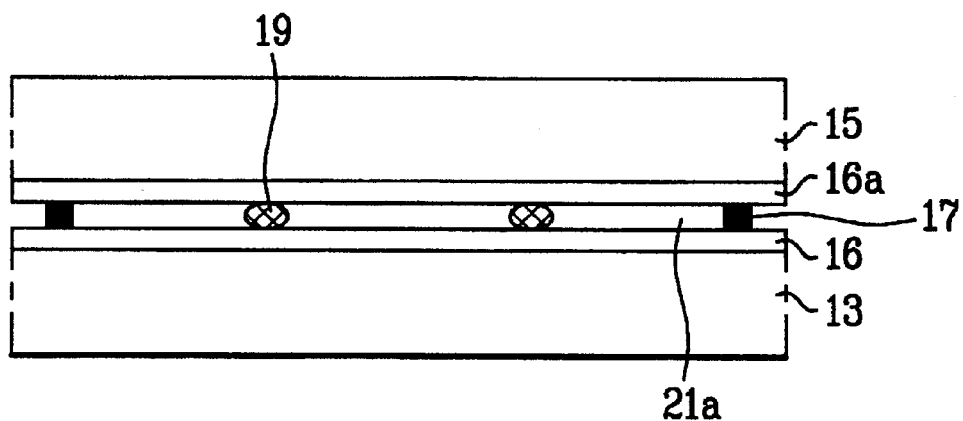
Figure 2E:
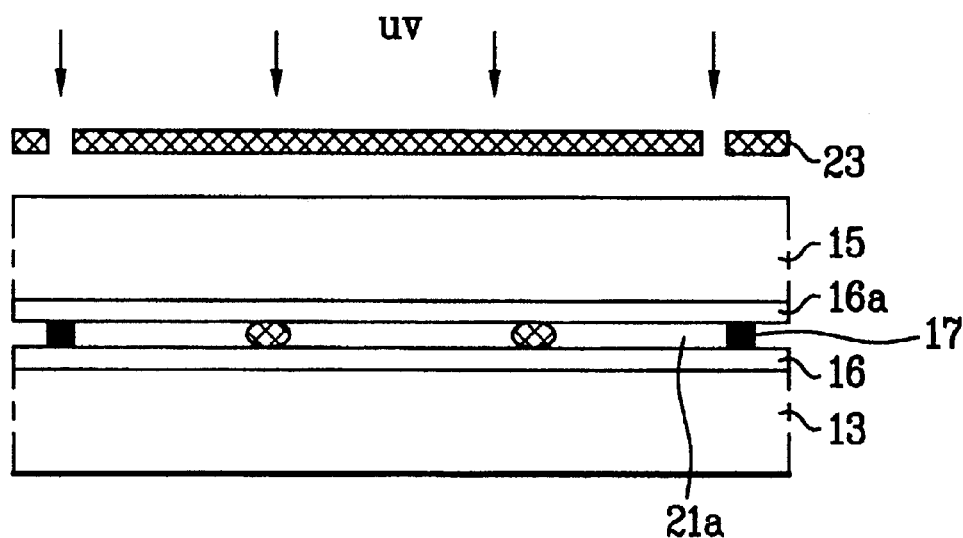
Figure 3:
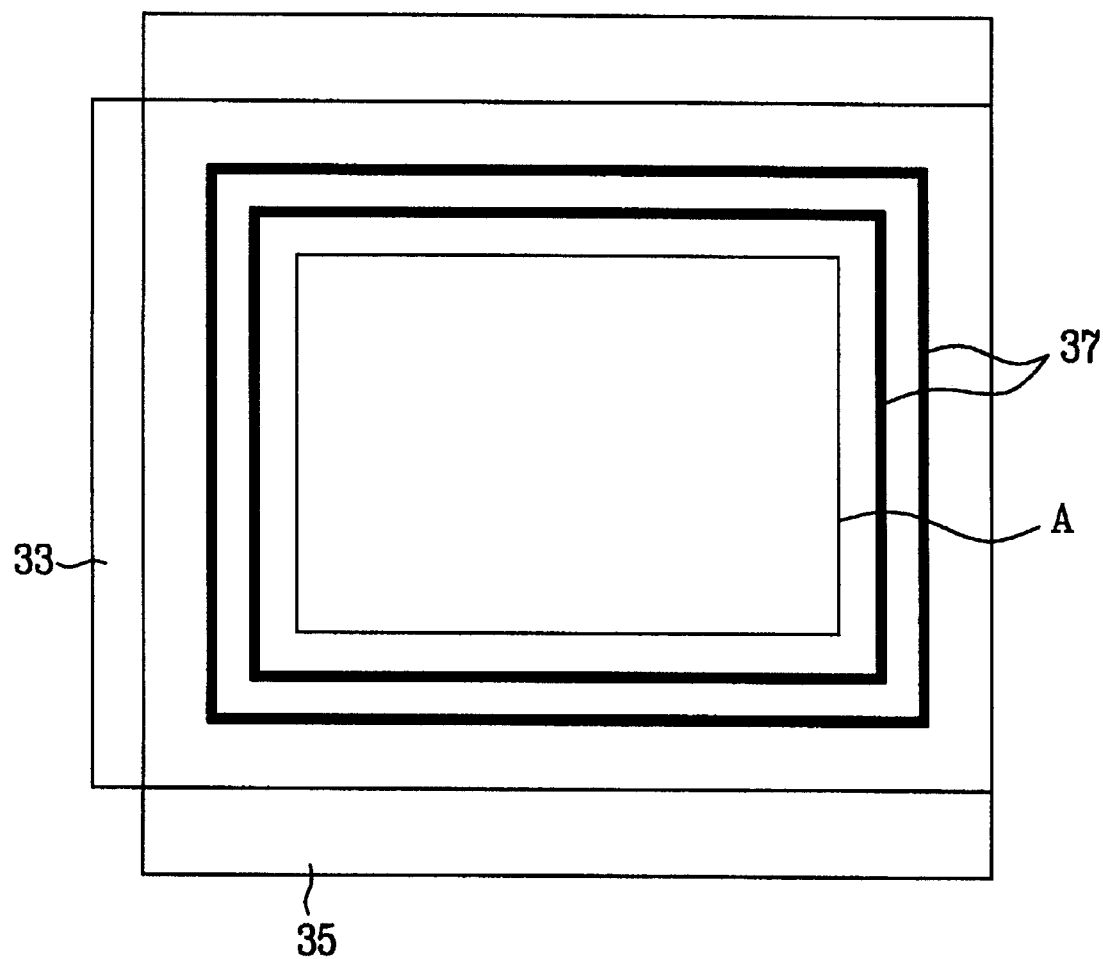
FIG. 3 is a plane view of an exemplary LCD panel according to the present invention.

FIG. 3 is a plane view of an LCD panel according to the present invention, and FIGS. 4A to 4D are sectional views illustrating exemplary fabricating process steps of manufacturing an LCD panel according to the present invention.

In FIG. 3, an exemplary LCD panel according to the present invention may include a double sealant 37, and liquid crystals containing a photo-reactant are formed in an active region A inside the double sealant 37 between a first substrate 33 and a second substrate 35. The first substrate 33 includes thin film transistors (TFTs) and pixel electrodes, and the second substrate includes a color filter pattern. The photo-reactant may include a photo-reactive polymer or a photo-reactive oligomer, for example.

Figure 4A:
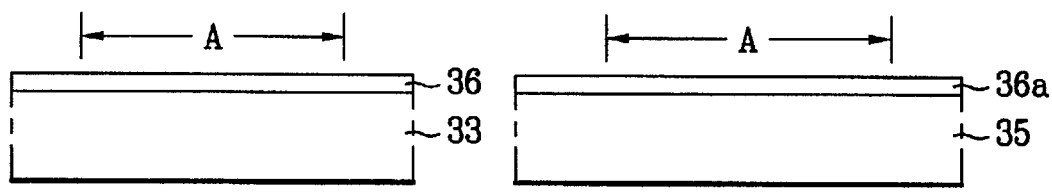
FIGS. 4A to 4D are cross-sectional views illustrating exemplary fabricating processing steps for manufacturing an LCD according to the present invention.

In FIG. 4A, a first substrate 33 and a second substrate 35 are prepared. On the first substrate, a plurality of TFTs (not shown) and pixel electrodes (not shown) are formed in an active region A. On the second substrate 35, a plurality of color filter patterns (not shown) are formed. Then, alignment layers 36 and 36a are respectively formed on the first and second substrates 33 and 35. Alternatively, alignment layers may be formed on only a single one of the first and second substrates 33 and 35.

Although not shown specifically, the first substrate 33 and the second substrate 35 will now be described in more detail. The first substrate 33 may include a gate line and a gate electrode on a glass substrate, and a gate insulating film may be formed on an entire surface including the gate electrode. The gate electrode may be formed of materials including metals such as Al, Cr, Mo, and Cu, for example. The gate electrode may be formed by a sputtering method and then subsequently patterned, for example. The gate insulating film may be formed of materials including silicon nitride or silicon oxide, for example. The gate insulating film may be formed by a Chemical Vapor Deposition (CVD) method, for example. The gate insulating film may also be formed of materials including benzocyclobutene (BCB), for example, to improve an aperture ratio. Subsequently, a semiconductor layer and an ohmic contact layer may be deposited on the gate insulating film. A data line may then be formed to orthogonally cross the gate line and source/drain electrodes of the TFT may be formed. The data line and the source/drain electrodes may be formed of metal materials, preferably the same metal materials used to form the gate line and the gate electrode. Then, a passivation film may be formed on an entire surface, and pixel electrodes may be formed on a pixel region defined by the gate line and the data line to connect with the drain electrode of the TFT through a contact hole. Accordingly, fabrication of the first substrate is complete.

In FIG. 4A, the second substrate 35 may be provided with red (R), green (G), and blue (B) color filter patterns to display colors, and a light-shielding layer in a matrix arrangement, for example, to prevent light from being transmitted to regions other than the pixel electrodes. Common electrodes may be formed on the color filter pattern including the light-shielding layer for applying a voltage to the pixel electrodes. In addition, prior to forming the common electrodes, an overcoat layer may also be formed to obtain uniformity of the color filter. After forming the first and second substrates 33 and 35 in which a plurality of patterns are formed, an alignment layer 36 and 36a is formed on the respective substrates or only on one of the first and second substrates 33 and 35.

Figure 4B:
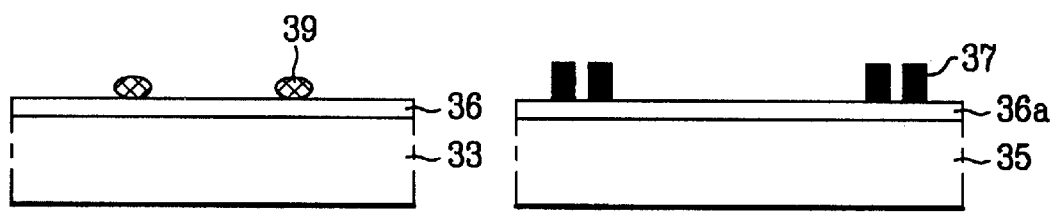

In FIG. 4B, the double sealant 37 having no injection hole may be formed along a periphery of the active region on the second substrate 35. A spacer 39 may be dispersed on the first substrate 33 to maintain a cell gap. Alternatively, a fixed-type column spacer composed of an organic material, for example, may be formed on one of the first substrate 33 and the second substrate 35 where the double sealant 37 is formed. The double sealant 37 may include a UV hardening sealant, for example. Alternatively, a sealant hardened by UV and heat may also be used.

Figure 4C:
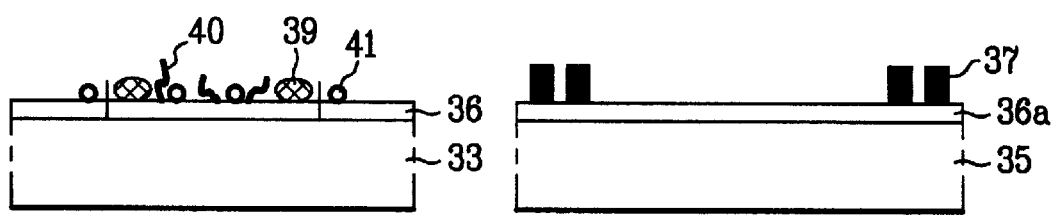

In FIG. 4C, liquid crystals 41 containing a photo-reactive polymer 40 or photo-reactive oligomer, for example, may be dispersed by a dispensing method on the first substrate 33.

Figure 4D:
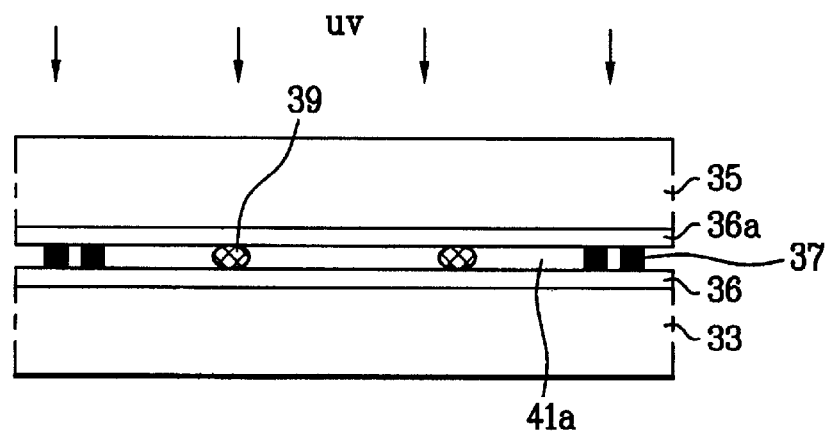

In FIG. 4D, the first and second substrates 33 and 35 may be attached in a chamber, for example. Accordingly, the liquid crystals 41 (of FIG. 4C) may be dispersed by a uniformly dispensing method in the panel, thereby forming a liquid crystal layer 41a. Then, if UV light is irradiated over the entire LCD panel, the UV hardening double sealant 37 is hardened by the UV light, and the liquid crystal layer is aligned as shown in FIG. 5B since the photo-reactant is contained in the liquid crystal layer.

Figure 5A:
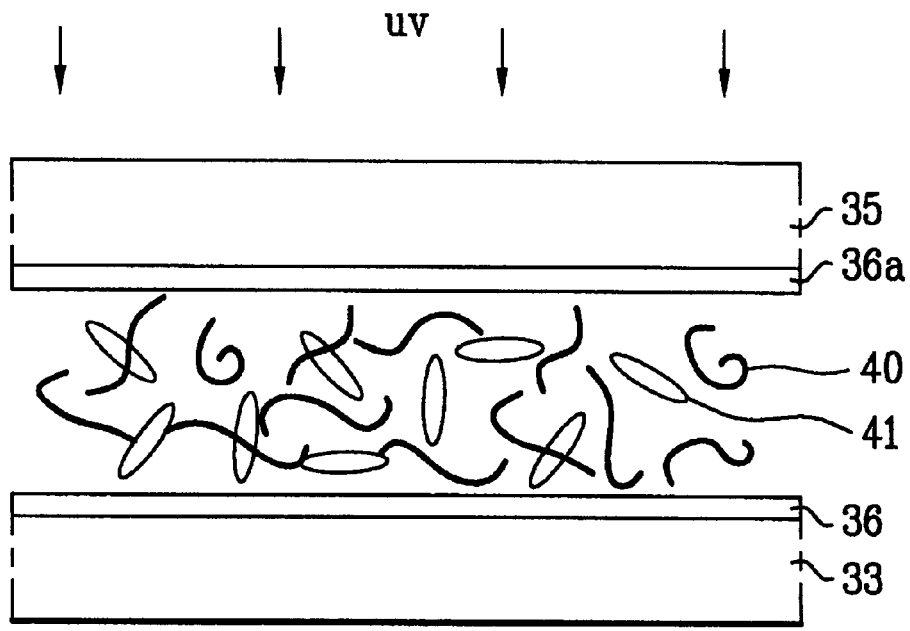
FIGS. 5A and 5B illustrate states of liquid crystals and a photo-reactant wherein irradiating UV into the liquid crystals having the photo-reactant.
Figure 5B:
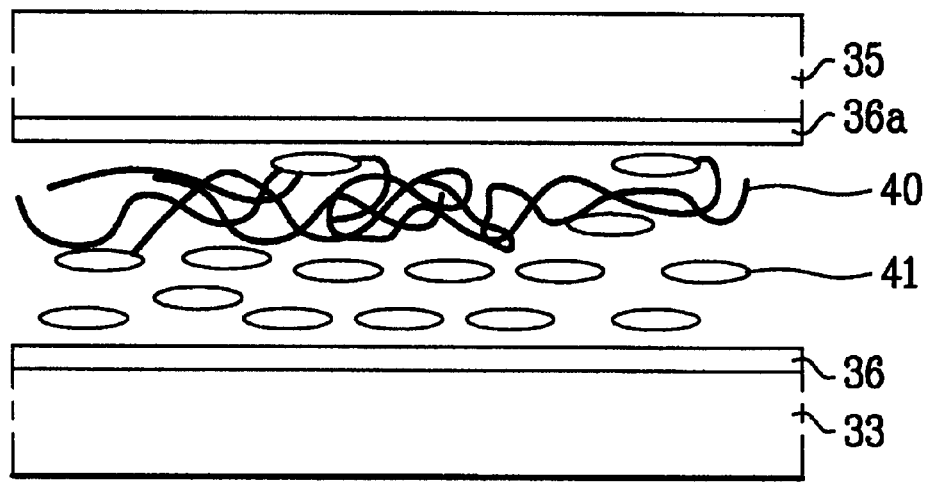

FIGS. 5A and 5B illustrate states of liquid crystals and a photo-reactant in case of irradiating UV light into the liquid crystals containing the photo-reactant.

In FIG. 5A, if UV light is irradiated into the liquid crystals 41, such as nematic liquid crystals or ferroelectric liquid crystals (FLC), for example, having a photo-reactive polymer 40 or a photo-reactive oligomer, for example, the photo-reactive polymer 40 will be aligned in an upward direction and the liquid crystal 41 will be aligned in a downward direction, as shown in FIG. 5B. Moreover, the alignment of the photo-reactive polymer 40 and the liquid crystal 41 may be dependent upon the types of liquid crystals and photo-reactants, as well as conditions required for irradiating UV light. However, if the UV light is linearly polarized, a separate irradiating process for controlling an initial alignment direction of the liquid crystal may not be necessary. Accordingly, hardening of the double sealant 37 and alignment of the liquid crystals 41 may be performed at the same time. Thus, the processing steps are simplified, thereby reducing processing time.

The present invention may be applied to IPS mode, TN mode, STN mode, VA mode, PDLC mode, FLC mode, and Poly-Si mode.

For example, an IPS mode determines an alignment direction of liquid crystal molecules by application of an electric field in a horizontal direction between two electrodes. The IPS mode can obtain high speed response time by using the liquid crystal containing the photo-reactant according to the present invention. That is, a photo-reactant, monomer is mixed with the liquid crystal and then injected into a cell. Subsequently, a polymer is formed by a photo polymerization, thus obtaining a Polymer Stabilized (PS)-IPS cell. Herein, constituents of the polymer affect operational characteristic of the IPS mode and corresponding drive voltages. Generally, an IPS mode LCD panel has an improved off-time characteristics as compared with on-time characteristic. The PS-IPS considerably improves the off-time characteristics through a polymer network.

Figure 6A:
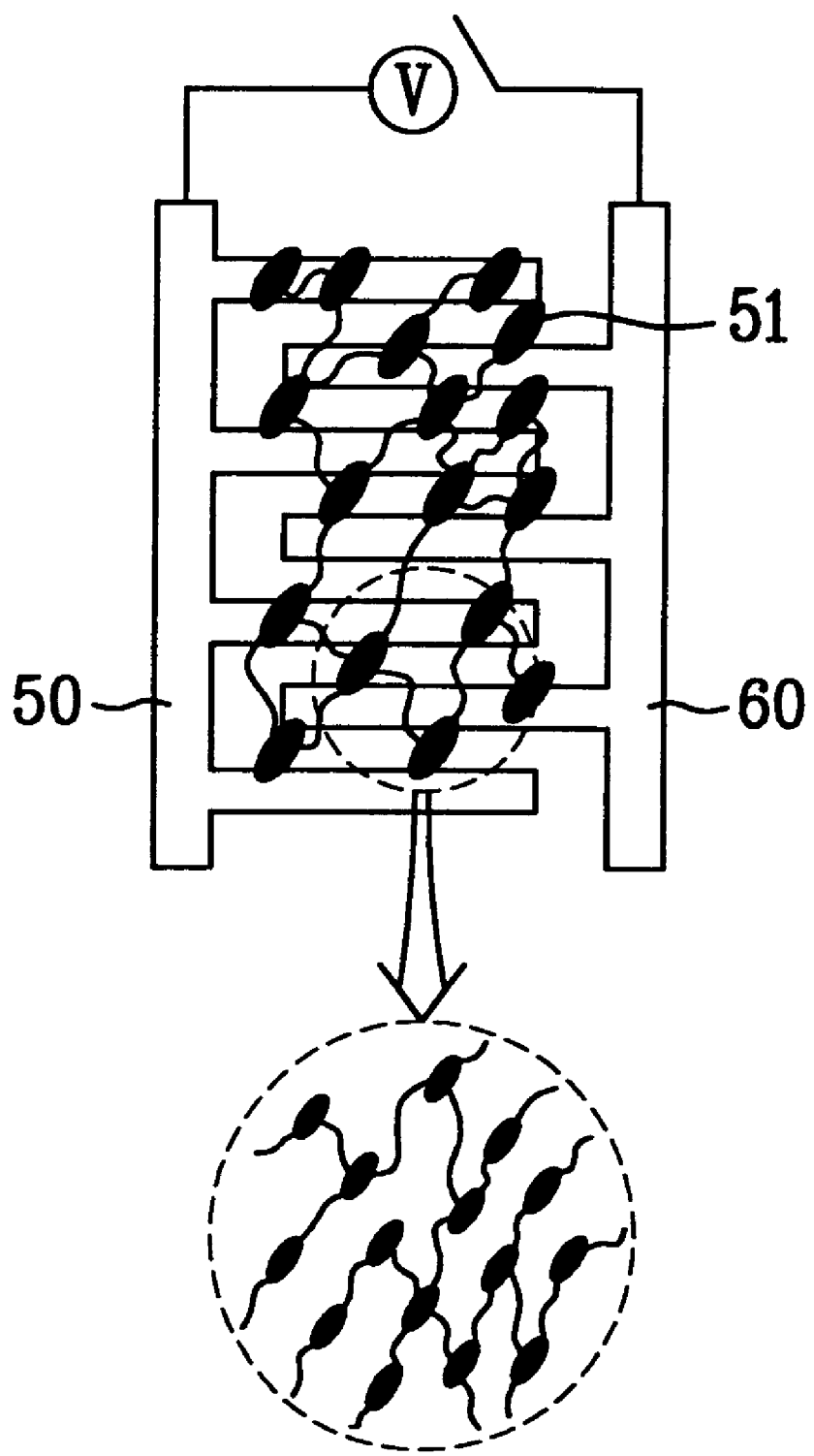
FIGS. 6A and 6B illustrate an alignment state of liquid crystals depending on whether a voltage is applied between two electrodes, in an IPS mode LCD device according to the present invention.

In FIG. 6A, at an initial stage when no voltage is applied across two electrodes 50 and 60, a polymer chain and the liquid crystal interact and are aligned in a first direction.

Figure 6B:
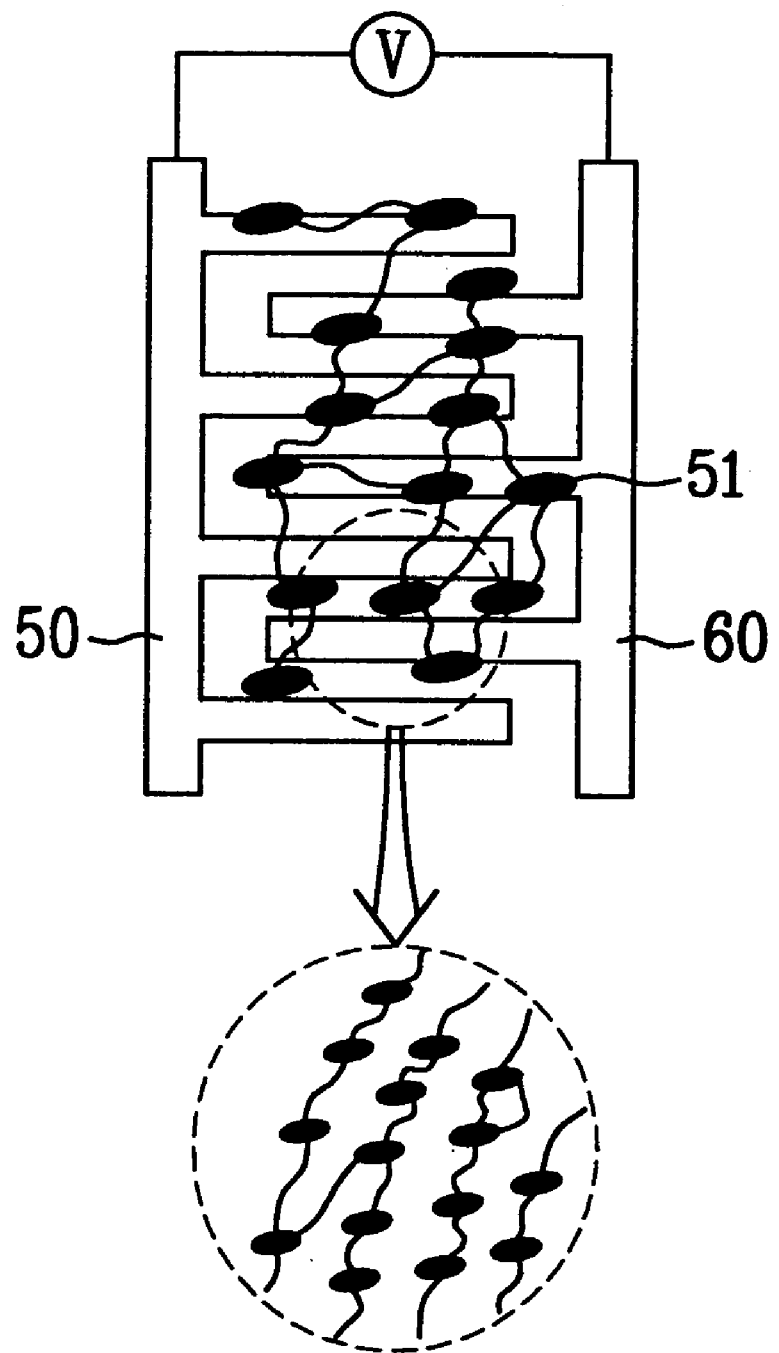

In FIG. 6B, when a voltage is applied across the two electrodes 50 and 60, liquid crystal molecules 51 are arranged by the applied electric field. Moreover, when the voltage is not applied across the two electrodes, a polymer network increases a restoring force to restore the liquid crystal molecules 51.

As described above, an exemplary method for manufacturing an LCD panel of the present invention has the following advantages. First, a UV hardening sealant or a sealant that can be hardened by UV light and heat is formed to attach upper and lower substrates to each other, and a liquid crystal layer containing a photo-reactant is formed in a cell. Accordingly, a separate mask is not required to mask the inside of the cell when UV light is irradiated to harden the sealant, thereby reducing production costs. In addition, a total number of processing steps can be minimized since the sealant is hardened and alignment of the liquid crystal is performed by a single irradiation process, thereby reducing processing time.

It will be apparent to those skilled in the art that various modifications and variations can be made in the method of the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display panel, comprising:

preparing first and second substrates having an active region;

forming a sealant along a periphery of the active region on at least one of the first and second substrates;

dispersing a liquid crystal material on the at least one substrate, the liquid crystal material having a photo-reactant material;

attaching the first and second substrates; and irradiating ultraviolet light on an entire surface of the at least one substrate to simultaneously cure the sealant and align the photo-reactant material.

2. The method according to claim 1, wherein the sealant is an ultraviolet hardening sealant.

3. The method according to claim 1, wherein the sealant is an ultraviolet and thermo-hardening sealant.

4. The method according to claim 1, wherein the photo-reactant material includes one of a photo-reactive polymer and a photo-reactive oligomer.

5. The method according to claim 1, wherein the ultraviolet light includes at least polarized ultraviolet light.

6. The method according to claim 1, further comprising forming an alignment layer on at least one of the first and second substrates.

7. The method according to claim 1, wherein the step of preparing the first substrate includes:

forming a plurality of gate lines and a gate electrode of a thin film transistor on the first substrate;

forming a gate insulating film on an entire surface of the first substrate;

forming a semiconductor layer on the gate insulating film;

forming data lines and source and drain electrodes on the semiconductor layer; and forming a pixel electrode on the source and drain electrodes.

8. The method according to claim 1, wherein the step of preparing the second substrate includes:

forming a light-shielding layer on the second substrate;

forming a color filter layer on the light-shielding layer; and forming a common electrode on the color filter layer.

9. The method according to claim 1, further comprising forming a spacer on at least one of the first and second substrates.

10. The method according to claim 9, wherein the spacer includes a column spacer.

11. A method for manufacturing a liquid crystal display panel, comprising:

forming at least one sealant along a periphery of an active region between first and second substrates;

dispersing a liquid crystal material in the active region, the liquid crystal material having a photo-reactant material and liquid crystals;

attaching the first and second substrates; and irradiating ultraviolet light on an entire surface of the first and second substrates to simultaneously cure the sealant and align the photo-reactant material.

12. The method according to claim 11, wherein the sealant includes an ultraviolet hardening sealant.

13. The method according to claim 11, wherein the sealant includes an ultraviolet and thermo-hardening sealant.

14. The method according to claim 5, wherein photo-reactant material remains uncured after irradiating ultraviolet light.

15. The device according to claim 11, wherein the photo-reactant material remains uncured.

16. The method according to claim 11, wherein photo-reactant material remains uncured after irradiating ultraviolet light.

* * * * *